(12) United States Patent
Florit et al.

(10) Patent No.: US 8,274,919 B2
(45) Date of Patent: Sep. 25, 2012

(54) SYSTEM AND METHOD FOR IMPLEMENTING MULTIPLE RING NETWORKS USING A COMMON LINK

(75) Inventors: Lionel Florit, Greenbrae, CA (US); Robert W. Klessig, Los Altos Hills, CA (US); Pauline Shuen, Palo Alto, CA (US); Francois E. Tallet, Santa Clara, CA (US)

(73) Assignee: Cisco Technology, Inc., San Jose, CA (US)

( * ) Notice: Subject to any disclaimer, the term of this patent is extended or adjusted under 35 U.S.C. 154(b) by 1113 days.

(21) Appl. No.: 11/218,886

(22) Filed: Sep. 2, 2005

(65) Prior Publication Data

US 2007/0047472 A1    Mar. 1, 2007

Related U.S. Application Data

(63) Continuation of application No. 11/215,469, filed on Aug. 30, 2005.

(51) Int. Cl.
*H04L 12/28* (2006.01)
(52) U.S. Cl. .................. 370/256; 370/405; 370/452
(58) Field of Classification Search .................. 370/221, 370/223, 401, 406, 408
See application file for complete search history.

(56) References Cited

U.S. PATENT DOCUMENTS

| | | | |
|---|---|---|---|
| 4,947,389 A | 8/1990 | Eng et al. | 370/85.12 |
| 6,658,013 B1 | 12/2003 | de Boer et al. | 370/404 |
| 6,717,922 B2 * | 4/2004 | Kamat et al. | 370/258 |
| 7,339,900 B2 * | 3/2008 | Perlman | 370/256 |
| 7,483,432 B2 * | 1/2009 | Nuss et al. | 370/395.3 |
| 2002/0163695 A1 | 11/2002 | Unitt et al. | 359/137 |
| 2003/0165119 A1 | 9/2003 | Hsu et al. | 370/258 |
| 2003/0223379 A1 | 12/2003 | Yang et al. | 370/256 |
| 2004/0059828 A1 | 3/2004 | Hooper et al. | 709/238 |
| 2005/0207348 A1 | 9/2005 | Tsurumi et al. | 370/241 |
| 2005/0210077 A1 | 9/2005 | Balakrishnan et al. | 707/200 |
| 2005/0249123 A1 | 11/2005 | Finn | 370/242 |
| 2006/0221972 A1 | 10/2006 | Bhargava et al. | 370/390 |

OTHER PUBLICATIONS

Daniel, Philippe, et al., pending U.S. Patent Application entitled "Multiple Ring Support Within a Single Network Element," U.S. Appl. No. 09/639,396, filed Aug. 15, 2000, including Specification: pp. 1-41; Drawings: Figures 1-5B on 7 sheets.

(Continued)

*Primary Examiner* — Yemane Mesfin
*Assistant Examiner* — Henry Baron
(74) *Attorney, Agent, or Firm* — Campbell Stephenson LLP

(57) ABSTRACT

Various systems and methods for implementing virtual ports within ring networks are disclosed. For example, one method involves allocating a logical port that corresponds to a first port and a second port and instantiating a spanning tree protocol instance. The first port and the second port are both assigned to a first ring network. The spanning tree protocol instance selectively blocks the logical port; however, the spanning tree protocol instance is unable to block the first port independently of blocking the second port. Events (e.g., link failures and recoveries) that occur within the ring network are communicated to spanning tree by transitioning the state of the logical port in response to receiving a ring protocol control packet. The spanning tree protocol instance initiates a bridge protocol data unit (BPDU) exchange from the logical port in response to a transition in the state of the logical port.

21 Claims, 10 Drawing Sheets

OTHER PUBLICATIONS

Machine Translation of JP 2003143169A; Enomoto, Atsushi et al.; Routing Bridge System, Node, Connection Node, and Routing Program; May 16, 2003; 1 page.

802.17, IEEE Standard for Information Technology—Telecommunications and Information Exchange Between Systems—Local and Metropolitan Area Networks—Specific Requirements, *Part 17: Resilient Packet Ring (RPR) Access Method and Physical Layer Specifications*, IEEE Computer Society, Sep. 24, 2004, 176 pages.

*Cisco AVVID Network Infrastructure: Implementing 802.1w and 802.1s in Campus Networks*, Implementation Guide, Cisco Systems, Apr. 2003, pp. 1-1 to 4-26.

Shah, S. and Yip, M, *Extreme Networks' Ethernet Automatic Protection Switching (EAPS) Version 1*, The Internet Society, Network Working Group, Request for Comments 3619, Oct. 2003, pp. 1-7.

Tsiang, D. and Suwala, G., *The Cisco SRP MAC Layer Protocol*, The Internet Society, Network Working Group, Request for Comments 2892, Aug. 2000, pp. 1-52.

\* cited by examiner

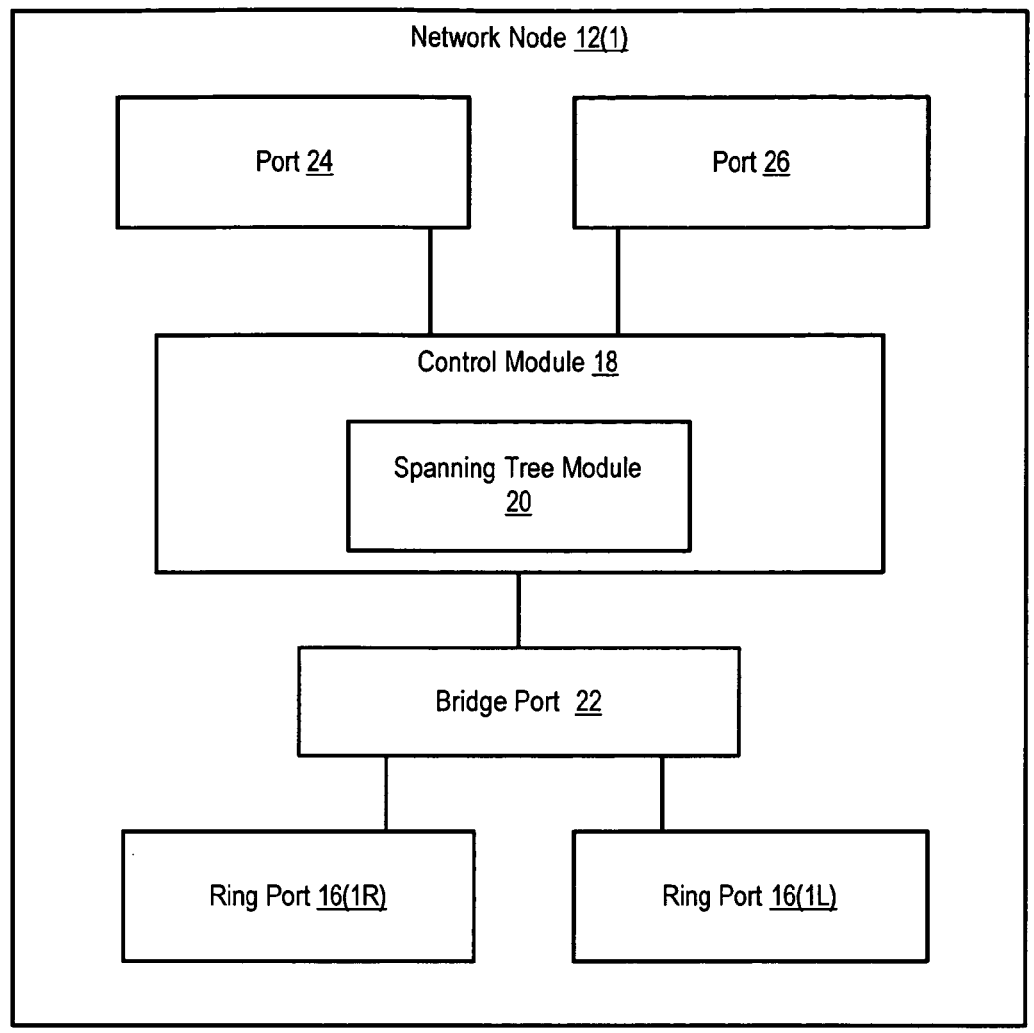
FIG. 2A
FIG. 2B
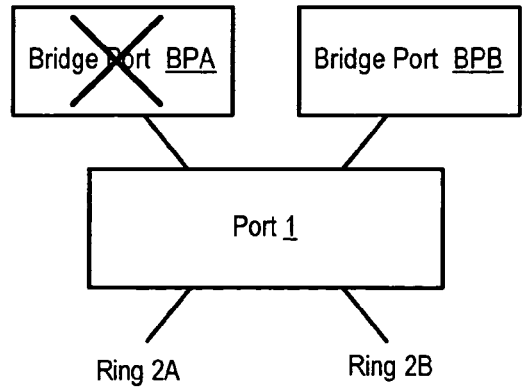

SYSTEM AND METHOD FOR IMPLEMENTING MULTIPLE RING NETWORKS USING A COMMON LINK

CROSS-REFERENCE TO RELATED APPLICATIONS

This application is a continuation of U.S. Patent application Ser. No. 11/215,469, entitled "System and Method for Implementing Virtual Ports Within Ring Networks," filed Aug. 30, 2005, and naming Lionel Florit, Robert W. Kiessig, Pauline Shuen, Francois E. Tallet as inventors. This application is assigned to CISCO TECHNOLOGY, INC., the assignee of the present invention, and is hereby incorporated by reference, in its entirety and for all purposes.

FIELD OF THE INVENTION

This invention relates to networking and, more particularly, to preventing loops within a hierarchy of networks that includes a ring network.

DESCRIPTION OF THE RELATED ART

An important trend in networking is the migration of packet-based technologies from local area networks (LANs) to metro area networks (MANs) and wide area networks (WANs). In the simplest terms, a WAN is a network that spans a large geographical area (some WANs are even worldwide). A MAN spans a larger geographic area than a LAN, but a smaller geographic area than a WAN. The rapidly increasing volume of data traffic in WANs is challenging the capacity limits of existing transport infrastructures based on circuit-oriented technologies such as Synchronous Optical Network (SONET), Synchronous Digital Hierarchy (SDH), and Asynchronous Transfer Mode (ATM). Inefficiencies associated with carrying increasing quantities of data traffic over voice-optimized circuit-switched networks makes it difficult to provision new services and increases the cost of building additional capacity beyond most carriers' capital expense budgets. Packet based transport technology is considered by many to be one of the best alternatives for scaling metropolitan networks to meet the demand. Accordingly, WANs and MANs implemented using packet-based transport technologies such as Ethernet are gaining popularity.

Ring topology networks can be used within WANs and MANs that are implemented using packet-based transport technologies. However, there are several situations involving ring topologies in which packet forwarding loops can arise. First, the ring itself forms a loop, and thus some sort of protocol must be employed to block this loop. Additionally, when several rings are connected, one or more switches are often included at the connection point in order to increase redundancy. The use of redundant switches potentially creates additional loops. Spanning Tree Protocol (STP) can be used to logically prevent loops within a network that includes physical loops. However, STP is not optimized for rings. In particular, convergence time under STP in a ring network may take several seconds. While STP is converging, network connectivity may be interrupted. Accordingly, techniques that improve STP convergence time in systems that include ring networks are desirable.

Additionally, as noted above, it is common to connect multiple rings such that one or more common switches form a connection point. In order to provide redundancy, it is often desirable to include multiple switches at the connection point. If there are multiple switches, referred to as aggregation switches, at the connection point, those switches are directly connected to each other. In these situations, an independent connection between the aggregation switches is required for each of the rings. If for example, 20 rings are aggregated at a connection point that includes two aggregation switches, it would be necessary to connect the two aggregation switches by 20 links in order to complete the access rings. Having so many links at the connection point limits scalability and increases the cost, physical space consumption, and complexity of the system. Accordingly, new techniques for forming connection points with redundant switches are desirable.

BRIEF DESCRIPTION OF THE DRAWINGS

A more complete understanding of the present invention may be acquired by referring to the following description and the accompanying drawings, in which like reference numbers indicate like features.

FIG. 2A is a block diagram of a network node that allocates a virtual port to each pair of ring ports, according to one embodiment of the present invention.

FIG. 2B is a block diagram illustrating how a physical port can be a ring port for multiple ring networks, according to one embodiment of the present invention.

Figure 1:
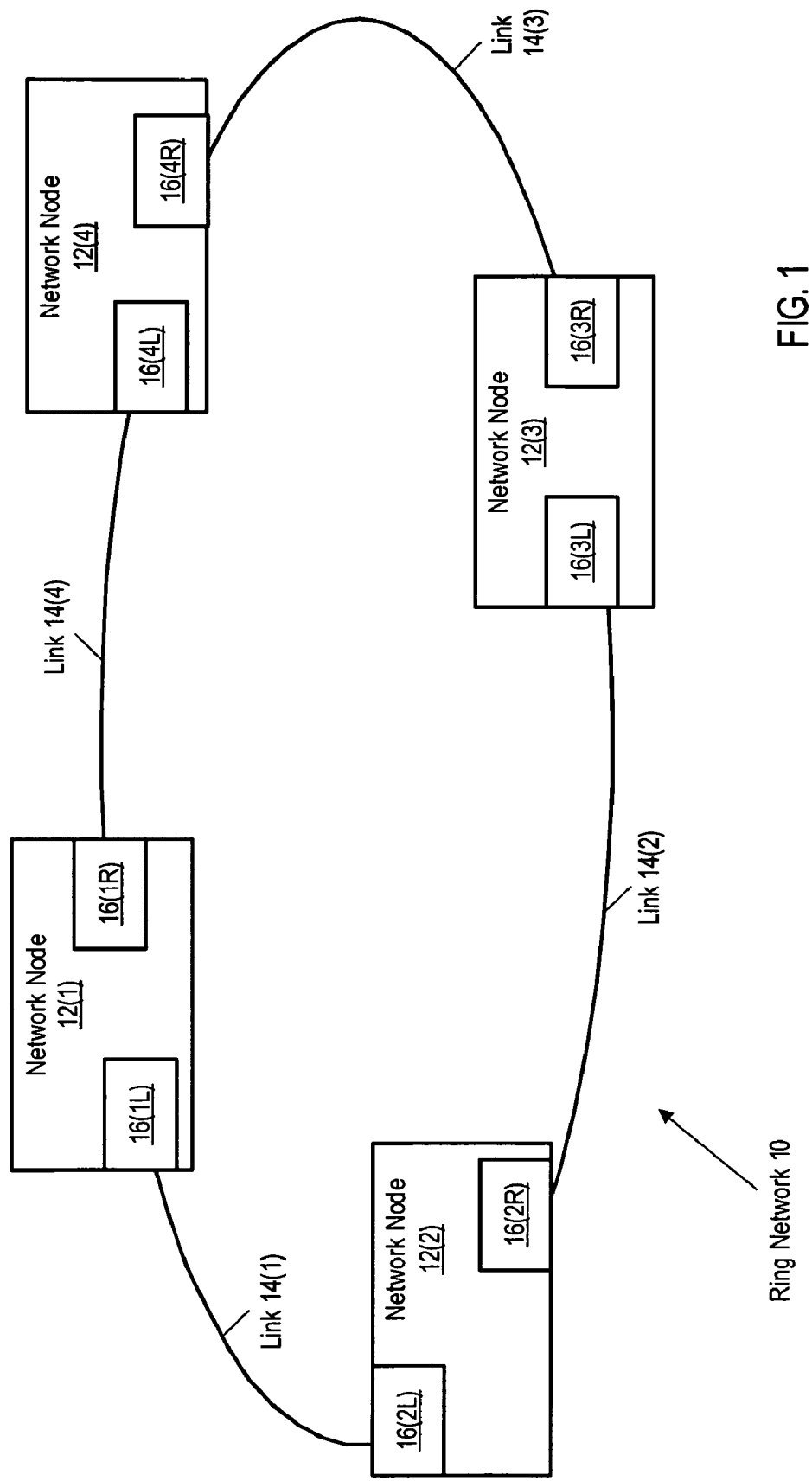
FIG. 1 shows an example of a ring network, according to one embodiment of the present invention.

While the invention is susceptible to various modifications and alternative forms, specific embodiments of the invention are provided as examples in the drawings and detailed description. It should be understood that the drawings and detailed description are not intended to limit the invention to the particular form disclosed. Instead, the intention is to cover all modifications, equivalents and alternatives falling within the spirit and scope of the invention as defined by the appended claims.

DETAILED DESCRIPTION

Throughout this document, the term "spanning tree protocol" and the abbreviation "STP" are used to generically refer to any network protocol that prevents loops within a network having redundant links. Such a network protocol operates by defining a tree that spans all network devices within the network. For example, the term "spanning tree protocol" can be used to describe network protocols implemented according to IEEE Standards 802.1D, 802.1q, 801.2s, and 802.1w. Similarly, the term "spanning tree protocol" can be used to describe Rapid Spanning Tree Protocol (RSTP), Multiple Spanning Tree Protocol (MSTP), per Virtual Local Area Network (VLAN) Spanning Tree (PVST and PVST+) and per VLAN rapid spanning tree (PVRST and PVRST+).

The term "packet" is used to refer to a logical grouping of information sent as a data unit over a transmission medium. Packets may include header and/or trailer information that surrounds user data contained in the data unit. For purposes of this disclosure, a "packet" may include a cell, datagram, frame, message, segment, or any other logical group of information.

FIG. 1 shows an example of a ring network. As shown, ring 10 includes network nodes 12(1)-12(4) as well as links 14(1)-14(4). In the illustrated embodiment, each link 14(1)-14(4) is a physical or logical link (e.g., an aggregated link such as an EtherChannel); however, it is noted that in alternative embodiments, various other types of connections can be used to interconnect network nodes. For example, another network (e.g., having a ring, mesh, star, or tree topology) can be used to link two of the network nodes. Additionally, while ring 10 is shown as a complete ring in FIG. 1, the techniques described herein can also be used in an incomplete ring (e.g., a daisy chain).

Network nodes 12(1)-12(4) are network devices such as switches, routers, and/or bridges that perform switching, routing, and/or bridging of packets. In one embodiment, network nodes 12(1)-12(4) perform Ethernet switching. Network nodes 12(1)-12(4) can act as part of an access network that provides customers and/or end-users with access to a network (e.g., the Internet). In such a situation, one or more of the network nodes can be coupled to customer devices (e.g., routers and/or switches) and/or end-user devices such as hosts. Additionally, network nodes 12(1)-12(4) can be coupled to network equipment that interconnects one or more access networks with a network.

Each link 14(1)-14(4) provides bidirectional communication between a pair of network nodes. For example, link 14(1) conveys packets between network nodes 12(1) and 12(2). Similarly, link 14(2) conveys packets between network nodes 12(2) and 12(3), and link 14(3) conveys packets between network nodes 12(3) and 12(4). Link 14(4) conveys packets between network nodes 12(1) and 12(4).

To facilitate communication via ring 10, network nodes 12(1)-12(4) implement a ring protocol, such as Rapid Ring Recovery (RRR), as implemented by products available from Cisco Systems, Inc. of San Jose, Calif. Such a ring protocol is implemented by exchanging ring protocol control packets between network nodes within the ring. These ring protocol control packets are used to detect continuity and connectivity within the ring as well as to detect failures within the ring. Ring behavior can be modified when failures are detected.

In embodiments implementing RRR, the RRR ring protocol logically breaks the communication loop formed within ring 10. In other words, the RRR ring protocol causes ring 10 to behave as if there is a communication break within ring 10, making it unnecessary to implement a Spanning Tree Protocol to break the loop within the ring. The RRR ring protocol causes this behavior by blocking data traffic at one or more points within the ring (e.g., in one embodiment, the protocol blocks all data traffic at one point within the ring; in another embodiment, the protocol blocks data traffic in different VLANs at different points within the ring). In one embodiment, the RRR ring protocol exchanges ring protocol control packets among nodes in order to select a "designated port", to block the designated port when the loop is complete, and to unblock the designated port in response to detecting a failure within the ring.

Each network node includes ring ports that are configured to operate as part of ring 10 (it is noted that each network node can also include other ring ports that are part of ring 10 or another ring network). A ring port is an interface that is coupled to a link (physical or logical) and configured to send ring protocol control packets. Normally, a network node includes a pair of ring ports for each ring in which the network node participates. As shown in FIG. 1, each network node includes a left (L) and a right (R) ring port: network node 12(1) includes ring ports 16(1L) and 16(1R); network node 12(2) includes ring ports 16(2L) and 16(2R); network node 12(3) includes ring ports 16(3L) and 16(3R); and network node 12(4) includes ring ports 16(4L) and 16(4R).

Data packets that are received on one ring port and that are not destined for the receiving network node (packets destined for the receiving network node are being sent to the receiving network node or a device that accesses the ring network via the receiving network node) can be relayed via the other ring port in the pair. For example, if network node 12(1) receives a data packet (i.e., a non-ring protocol control packet) via port 16(1R), and if the packet is not destined for network node 12(1), network node 12(1) can output that packet from port 16(1L).

Ring protocol control packets are detected by ring ports and processed by the network node. For example, in response to receiving a ring protocol control packet via port 16(1L), ring port 16(1L) can generate an interrupt that causes a processor within network node 12(1) to handle the ring protocol control packet. In response to processing a ring protocol control packet, the network node can generate another ring protocol control packet, which may simply be a copy of the received ring protocol control packet, to send from the receiving ring port (e.g., in response to the ring protocol control packet) or from the paired ring port (e.g., if the ring protocol control packet is being sent around the ring).

In the ring network of FIG. 1, one or more of network nodes 12(1)-12(4) instantiate an instance of a spanning tree protocol (i.e., a spanning tree instance). Since the ring protocol is already blocking the loop within the ring, however, there is no need for spanning tree instance to block loops within the ring (i.e., there is no need for the spanning tree instance to block individual ring ports). Accordingly, each network node that instantiates a spanning tree instance allocates a logical port, referred to herein as a bridge port, to each pair of ring ports that are included in the same ring. The spanning tree instance can block the bridge port in order to prevent a loop; however, the spanning tree instance cannot block either of the individual ring ports that are included in the bridge port.

FIG. 2A shows a block diagram of a network node that implements a bridge port. As shown, network node 12(1) (e.g., network node 12(1) of FIG. 1) includes a control module 18, which in turn includes a spanning tree module 20. Network node 12(1) also includes ports 24 and 26 as well as a bridge port 22, which is a logical port that includes ring ports 16(1R) and 16(1L).

Control module 18 can include forwarding and/or routing functionality. Control module 18 includes spanning tree module 20, which instantiates one or more instances of a spanning tree protocol in order to prevent communication loops. In some embodiments, there is one spanning tree instance per virtual local area network (VLAN). It is noted that in some embodiments having multiple spanning tree instances, there is one logical bridge port per spanning tree instance per pair of ring ports (e.g., the same pair of ring ports can be included in multiple bridge ports—one for each spanning tree instance instantiated within the network node). Control module 18 can be implemented in hardware, software, or a combination of hardware and software (e.g., all or part of control module 20 can be implemented in software that is executed by one or more processors within network node 12(1)).

As noted above, ring ports 16(1R) and 16(1L) are ports that are coupled to send and receive packets as part of a ring network. Bridge port 22 is a logical port controlled by spanning tree module 20. In particular, spanning tree module 20 can block bridge port 22, so that packets received by bridge port 22 (i.e., packets received via one of ring ports 16(1R) and 16(1L)) cannot be sent to ports (e.g., ports 24 and 26) other than the ring ports associated with bridge port 22, and so that packets received by other ports (e.g., ports 24 and 26) cannot be sent from bridge port 22 (i.e., these packets cannot be output via one of ring ports 16(1R) and 16(1L)). Spanning tree module 20 can also unblock bridge port 22 (e.g., if it is not necessary to block bridge port 22 in order to prevent a loop).

When spanning tree module 20 detects a loop within a network topology, spanning tree module 20 selects a port to block in order to break the loop. Spanning tree module 20 blocks a port by controlling packet flow in such a way that packets cannot be conveyed to and from the blocked port. For example, spanning tree module 20 can block a port by updating state information associated with that particular port to indicate that the port is in a blocked state, and this state information can in turn control how forwarding and routing decisions are made within network node 12(1). Spanning tree module 20 can similarly unblock a port by controlling packet flow in a manner that allows packets to be conveyed to and from the blocked port.

Other than by blocking bridge port 22, spanning tree module 20 cannot block ring port 16(1R) and ring port 16(1L). In other words, spanning tree module 20 cannot independently block ring port 16(1R) without blocking ring port 16(1L), and vice versa. Spanning tree module 20 also cannot prevent ring ports 16(1R) and 16(1L) from exchanging packets with each other. Even if bridge port 22 is blocked, ring port 16(1R) can send packets to ring port 16(1L), and vice versa.

From the perspective of spanning tree module 20, there is one Media Access Control (MAC) address for the bridge port (it is noted that the MAC address associated with the bridge port actually represents two physical ports (ring ports 16(1L) and 16(1R)). Accordingly, spanning tree module 20 handles the ring network that includes ring ports 16(1L) and 16(1R) in the same manner that a local area network (LAN) is handled.

Control module 18 establishes bridge port 22 by associating the two ring ports with a single MAC (e.g., by updating state information associated with each ring port). Each ring network has a unique ring identifier. When a port is configured as a ring port of a particular ring network, the port is associated with the ring identifier of that ring network. Accordingly, control module 18 determines that ring ports are in the same ring, and thus should be associated with the same MAC, by examining the ring identifiers associated with each ring port. If two ring ports are associated with the same ring identifier, then those ring ports are part of the same ring network. If a network node includes more than two ring ports in the same ring (e.g., if more than two ring ports are associated with the same ring identifier), then the ring ports are configured into pairs by an administrator. In one embodiment, all of the ring ports in a given ring are assigned with the same bridge port, and that bridge port is associated with a single MAC (i.e., there is one MAC per ring).

It is noted that one physical port can be a ring port for multiple different ring networks, and thus one port can be associated with multiple ring identifiers. Consequentially, one ring port can be assigned to several different bridge ports, each representing a different ring network. Those bridge ports can be blocked and unblocked independently of one another, and thus the ability of the ring port to send packets to ports other than the paired ring port will vary based upon the ring in which a particular packet is received. For example, looking at FIG. 2B, if a physical port 1 is a ring port for ring networks 2A and 2B, port 1 will be represented by two bridge ports, BPA (for ring network A) and BPB (for ring network B). If a spanning tree module is blocking BPA but not blocking BPB, as shown by the "X" in FIG. 2B, packets that port 1 receives from ring network B can be sent to both a paired ring port in ring network B as well as to other ports within the network node. However, packets that port 1 receives from ring network A can only be sent to the paired ring port within ring network A, since BPA is currently blocked by spanning tree.

Returning to FIG. 2A, control module 18 performs address "learning" in order to forward packets. For example, if a packet from address A (i.e., a packet having address A as its source address) is received via port 24, control module 18 "learns" that address A is reachable via port 24. If network node 12(1) subsequently receives a packet addressed to address A, control module 18 will forward that packet to port 24. Thus, "learning" an address involves associating the address with the port that can be used to forward packets to that address. When a bridge port is allocated for a pair of ring ports, addresses can be learned for the bridge port. Thus, if ring port 16(1R) receives a packet having source address C, address C can be "learned" by associating address C with bridge port 22. Control module 18 can also learn addresses for the individual ring ports included in the bridge port, so source address C can also be associated with ring port 16(1R) (in addition to being associated with the bridge port) in response to receiving the packet.

When a ring protocol control packet is received that identifies a failure within the ring network, the receiving ring port notifies the control module. This causes the control module to flood any address forwarding information that is associated with the receiving ring port (e.g., any forwarding information that was "learned" based on packets received by the bridge port allocated for that ring port is deleted) to the other ring port(s) within the same ring network. This causes that address forwarding information to be associated with the other ring ports in the same network. Thus, if a ring port experiences a failure, the address forwarding information associated with that ring port is transferred to the paired ring port (e.g., if an address is associated with ring port 16(1R) and that ring port fails, the address will become associated with ring port 16(1L)). If, as described above, learned addresses are associated with the bridge port associated with a pair of ring ports (as opposed to being associated with the individual ring ports themselves), no action is needed to transfer learned information to the paired port, since the information is already associated with the bridge port (instead of the failed ring port).

When bridge port 22 is unblocked, control module 18 can "learn" addresses that are reachable via bridge port 22. In some embodiments, when bridge port 22 is blocked by spanning tree module 20, control module 18 does not "learn" addresses on that bridge port. In other words, if bridge port 22 is blocked, control module 18 will not identify any addresses as being reachable via bridge port 22. However, learning on the ring ports can still continue while the bridge port is blocked.

In one embodiment, while bridge port 22 is blocked, packets (other than ring protocol control packets) received via either of ring ports 16(1L) and 16(1R) are flooded to the other ring port, regardless of whether those packets are broadcast, unicast, or multicast packets, and regardless of whether the destination addresses of those packets are "known" (known addresses are addresses that have been learned by control module 18). Thus, while bridge port 22 is blocked, any packet (other than a ring protocol control packet) that is received via ring port 16(1R) will be sent to ring port 16(1L), and vice versa. Ring protocol control packets are handled normally in this situation (e.g., the receiving ring port can process the received ring protocol control packet and determine whether to forward a copy of that ring protocol control packet to the paired ring port).

Network node 12(1) can communicate certain ring network events (such as failures and recoveries from failures within the ring network) to spanning tree module 20, by changing the state (e.g., failed or non-failed) of bridge port 22. In particular, if one of ring ports 16(1L) and 16(1R) receives a ring protocol control packet indicating such a ring event, control module 18 updates the state of the bridge port to indicate that the link coupled to the bridge port is failed. This causes spanning tree module 20 to reevaluate the network topology (e.g., by sending Bridge Protocol Data Units (BPDUs) to other network nodes). Control module 18 can then update the state of the bridge port to indicate that the link coupled to the bridge port is not failed.

By causing spanning tree module 20 to reevaluate the network topology in response to detecting a ring event, spanning tree module 20 will see any changes in the network topology that resulted from the ring event. For example, spanning tree module 20 can send BPDUs in response to the change in state (from non-failed to failed) of bridge port 22. As the BPDUs are returned and/or timeout, spanning tree module 20 determines the topology of the network. If the network topology changed due to the ring event, that change in topology will be identified by the returned and/or timed out BPDUs. Accordingly, the spanning tree module 20 can update its network topology based on the ring event. This can in turn cause spanning tree module 20 to block and/or unblock one or more ports within network node 12(1).

By using bridge port 22 to represent ring ports 16(1R) and 16(1L) to spanning tree module 20, network node 12(1) can use spanning tree module 20 to bridge traffic from a ring network (coupled to ring ports 16(1L) and 16(1R)), which may not use spanning tree, to other networks. Since a single MAC represents both ring ports in the ring network, the ring network appears (to spanning tree module 20) to be a LAN segment. The ring network can be handled as a LAN segment since the ring protocol used by the ring network breaks any loops within the ring network.

When spanning tree module 20 sends BPDUs, spanning tree module 20 causes a BPDU to be output from each port of network node 12(1) that is controlled by spanning tree module 20. Thus, in the example of FIG. 2A, spanning tree module 20 can output a BPDU from each of bridge port 22, port 24, and port 26. When a BPDU is sent to a bridge port, such as bridge port 22, that represents one or more ring ports, a copy of the BPDU is output from each ring port represented by the bridge port. When a BPDU is received by a ring port that is represented by a bridge port, the BPDU is forwarded from the receiving ring port to the bridge port as well as to the paired ring port. It is noted that if a ring port is blocked by the ring protocol, the BPDUs should not pass through the blocked port. This ensures that the STP topology is consistent with the available data paths.

Figure 3:
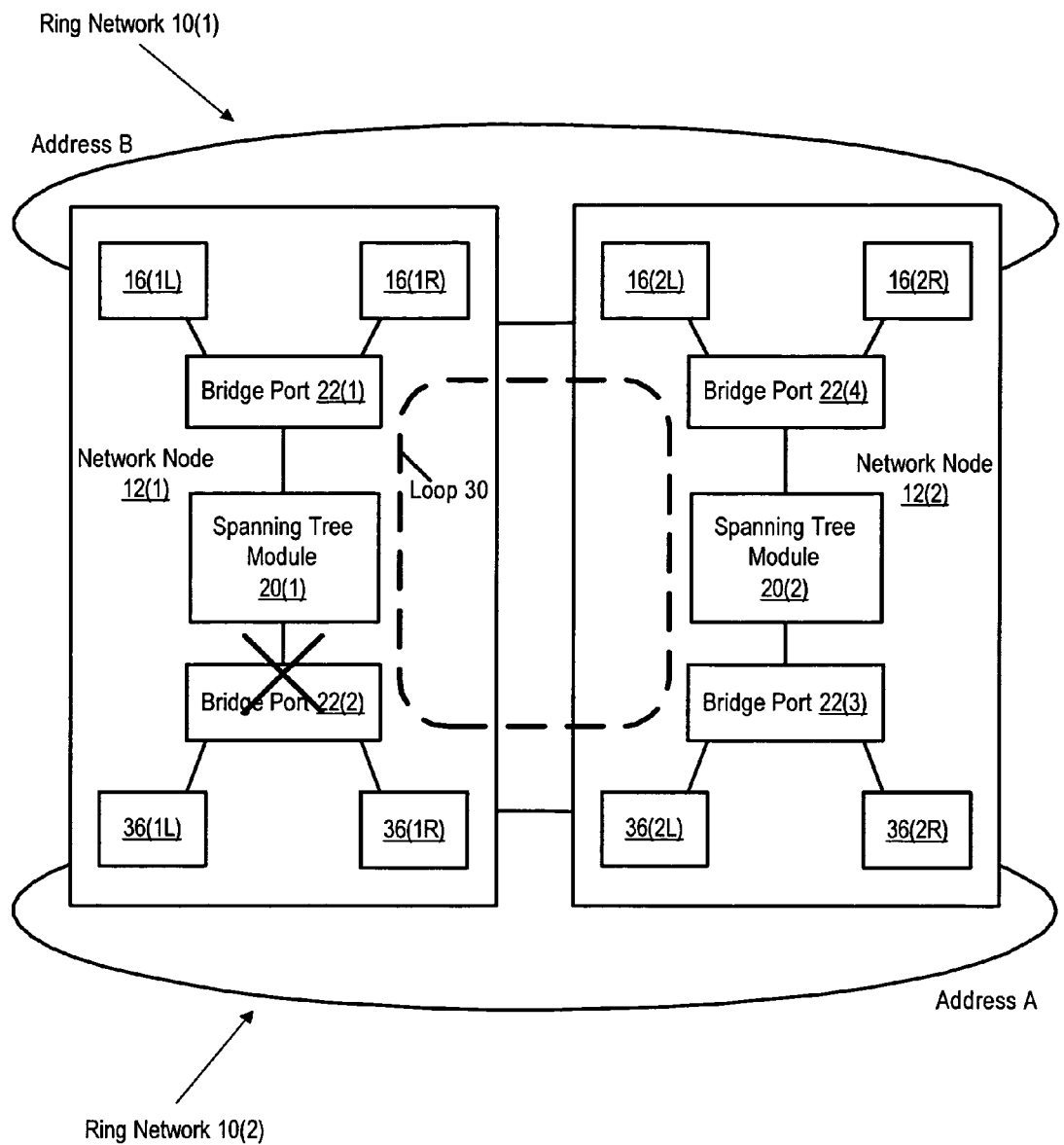
FIG. 3 is a block diagram of a pair of network nodes that provide a connection point for two ring networks, according to one embodiment of the present invention.

FIG. 3 is a block diagram of a pair of network nodes that provide a connection point for two ring networks. As shown, network node 12(1) is coupled to network node 12(2) by two ring networks, ring network 10(1) and ring network 10(2). Network node 12(1) includes ring ports 16(1L) and 16(1R), which are represented by bridge port 22(1) and coupled to ring network 10(1), as well as ring ports 36(1L) and 36(1R), which are represented by bridge port 22(2) and coupled to ring network 10(2). Network node 12(1) also includes spanning tree module 20(1), which can block and unblock bridge ports 22(1) and 22(2).

Network node 12(2) includes ring ports 16(2L) and 16(2R), which are represented by bridge port 22(4) and coupled to ring network 10(1), as well as ring ports 36(2L) and 36(2R), which are represented by bridge port 22(3) and coupled to ring network 10(2). Network node 12(2) also includes spanning tree module 20(2), which can block and unblock bridge ports 22(3) and 22(4).

A loop 30 exists within the topology of the network shown in FIG. 3. Spanning tree modules 20(1) and 20(2) output BPDUs and use the returned and/or timed-out BPDUs (timed-out BPDUs are BPDUs that are not returned to the sending network node before the expiration of a timeout period) to detect this topology and to select a port to block in order to break any loops detected within the topology. In response to detecting loop 30, spanning tree modules 20(1) and 20(2) identify bridge port 22(2) as the port to block in order to break the loop, as indicated by the "X" over bridge port 22(2).

Once bridge port 22(2) is blocked, packets cannot be forwarded from bridge port 22 to bridge port 22(1). Accordingly, if a device having address A (shown as being reachable via ring port 36(2R)) sends a packet to a device having address B (shown as being reachable via ring port 16(2R)), that packet cannot be conveyed via bridge port 22(2). Instead, the packet will need to be conveyed from bridge port 22(3) then to bridge port 22(4).

Figure 4:
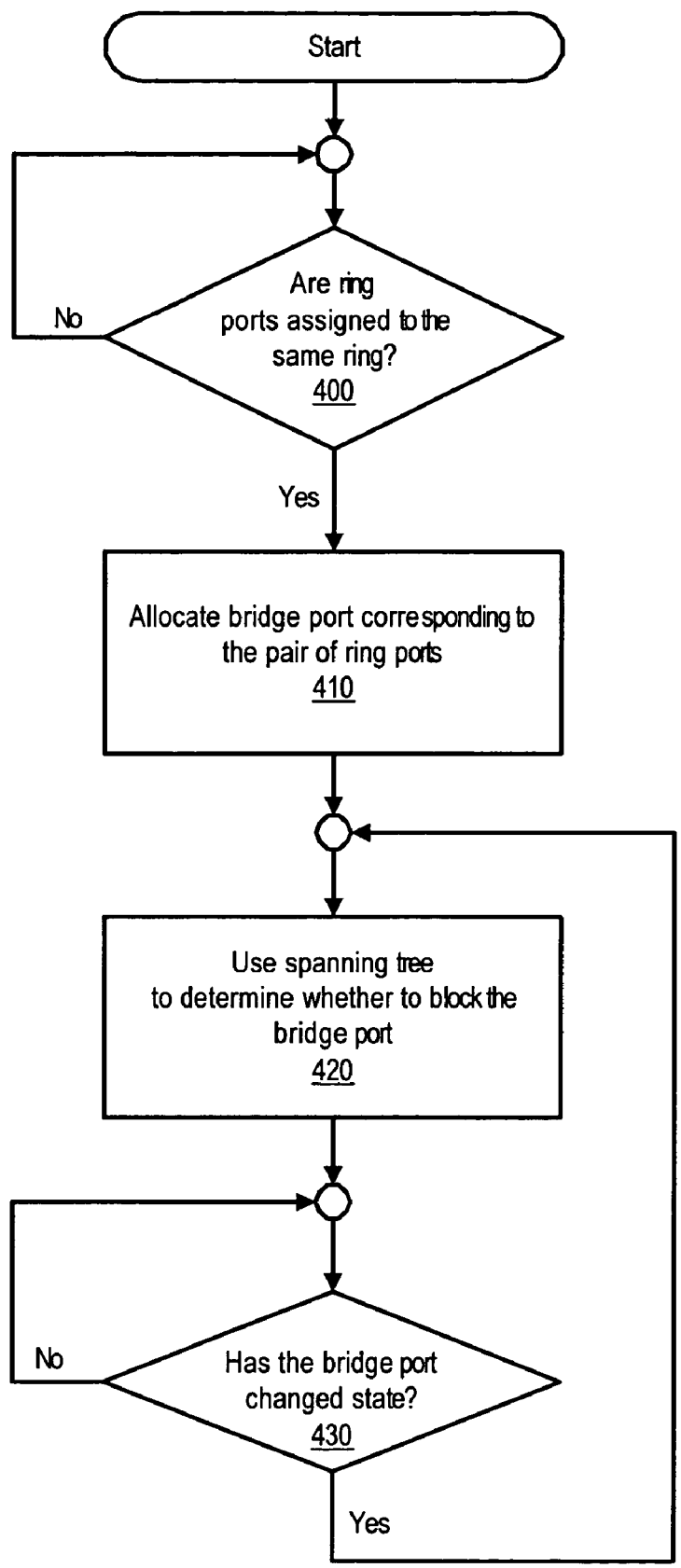
FIG. 4 is a flowchart of a method of using virtual ports to implement spanning tree within a network node that includes ring ports, according to one embodiment of the present invention.

FIG. 4 is a flowchart of a method of using virtual ports to implement spanning tree within a network node that includes ring ports. This method can be performed by a control module (e.g., control module 18 of FIG. 2A), which can include one or more forwarding engines (such forwarding engines can be distributed among several line cards) and/or route processors. The control module instantiates one or more instances of a spanning tree protocol.

The method begins at 400, when a determination is made as to whether two ring ports have been assigned to the same ring. This determination can be made by examining the ring identifiers associated with each ring port. If the ring identifiers are the same, the ring ports are assigned to the same ring network.

If the ring ports are assigned to the same ring network, a bridge port that corresponds to the pair of ring ports is allocated, as shown at 410. This bridge port can be allocated by updating state information associated with each ring port. A single MAC represents the bridge port. The bridge port can be controlled by a spanning tree instance (i.e., the spanning tree instance can block and unblock the bridge port and can perform network topology discovery in response to detecting a change in state (from failed to non-failed or vice versa) of the bridge port).

At 420, a spanning tree protocol is used to determine whether to block the bridge port. In particular, a spanning tree instance can send one or more BPDUs. As the BPDUs are returned and/or time out, the spanning tree instance discovers the network topology, detects loops within the topology, and selects a port to block, if such action is need to break a loop. Thus, if needed to break a loop, the spanning tree protocol can block the bridge port. Blocking the bridge port prevents packets from being sent to or from the bridge port, from other ports within the network node that includes the bridge port. However, the ring ports represented by the bridge port can still forward packets between themselves, even while the bridge port is blocked. The spanning tree protocol cannot independently block these ring ports.

If the bridge port changes state (e.g., from failed to non-failed or non-failed to failed), as detected at 430, the spanning tree protocol can again discover the network topology and determine whether to block the bridge port. The state of the bridge port can be updated in response to both of the ring ports represented by the bridge port experiencing a failure, or in response to one of those ring ports receiving a ring protocol control packet that indicates a failure somewhere within the ring network.

Figure 5:
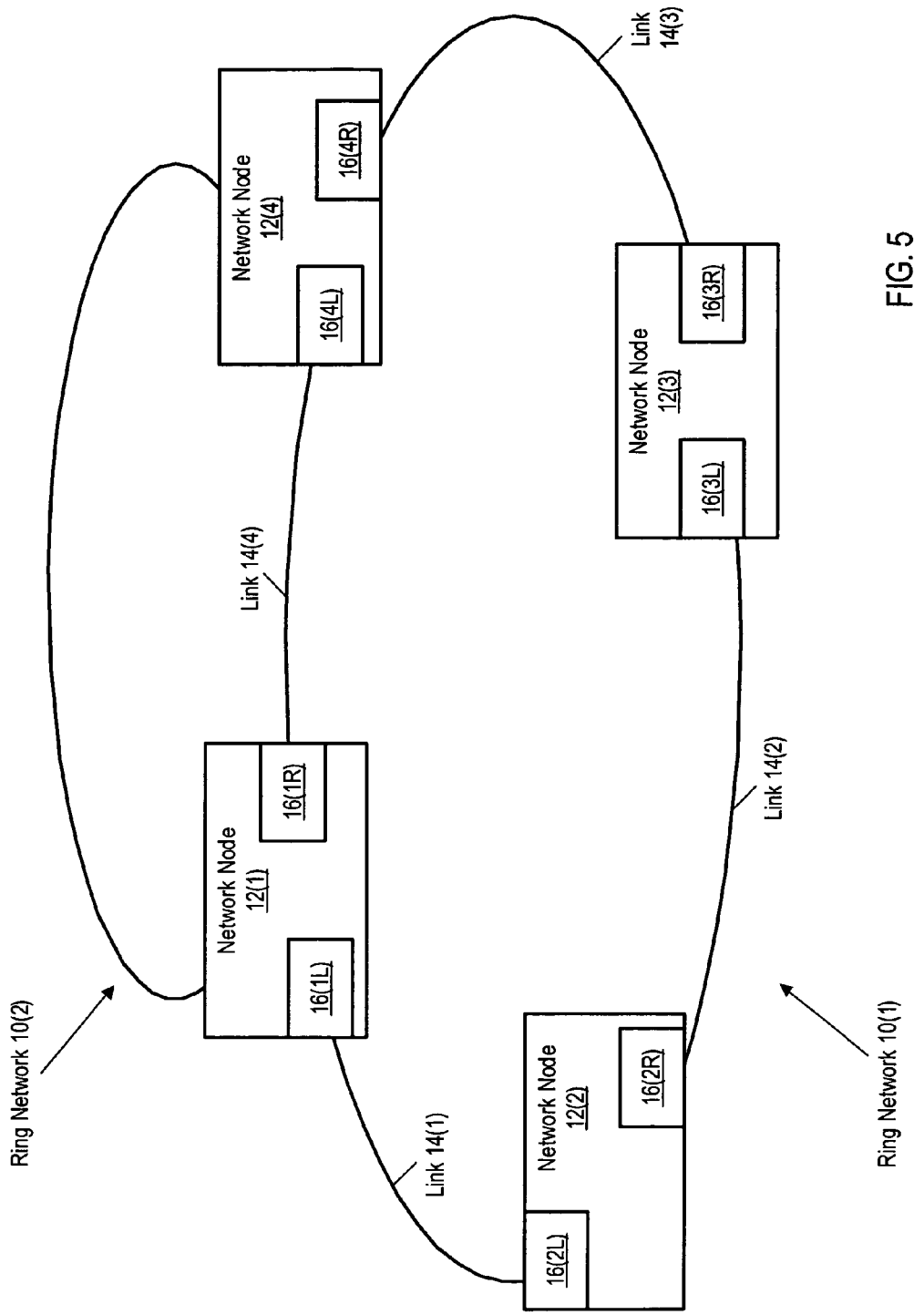
FIG. 5 is a block diagram illustrating how a common link is shared by two ring networks, according to one embodiment of the present invention.

FIG. 5 is a block diagram illustrating how a common link is shared by two ring networks. In this example, the network shown in FIG. 1 has been supplemented by an additional ring network, ring network 10(2). In this example, ring network 10(2) couples network nodes 12(1) and 12(4). Accordingly, network nodes 12(1) and 12(4) provide a redundant connection point for ring networks 10(1) and 10(2).

Link 14(4) is shared between ring networks 10(1) and 10(2). It is noted that link 14(4) can include an aggregated link (e.g., as implemented using EtherChannel or Port Aggregation Protocol (PAgP)).

Since link 14(4) is shared between multiple ring networks, link 14(4) is referred to as a "common" link. Ring ports coupled to a common link implement specialized functionality in order to differentiate traffic being sent via the common link, based upon the ring network in which that traffic is being conveyed. In particular, ring protocol control packets that are sent via a common link are associated with information identifying the incoming ring before being sent across the common link. In one embodiment, all ring protocol control packets include a ring identifier field (e.g., this field can be included in the header of each ring protocol control packet), and this field associates each packet with the incoming ring. In another embodiment, this information is added to the received ring protocol control packets by appending a value, which includes the ring identifier, to the ring protocol control packet before transmission over the common link.

Ring port 16(4L) receives the ring protocol control packet and the associated ring identifier via link 14(4) and uses the ring identifier to select the ring network on which the ring protocol control packet should be sent. In this example, the ring identifier identifies ring network 10(1), so ring port 16(4L) sends the ring protocol control packet to ring port 16(4R) in ring network 10(1). If the associated ring identifier is not part of the ring protocol control packet, ring port 16(4L) can also remove the associated ring identifier from the ring protocol control packet before sending it.

When packets other than ring protocol control packets are sent via common link 14(4), these packets are not associated with ring identifiers. The receiving network node uses normally forwarding procedures to determine the ring network on which to output those packets. For example, if network node 12(4) receives a packet, which is not associated with a ring identifier, via link 14(4), a control module within network node 12(4) can use the packet's destination address type (e.g., broadcast or unicast) as well as any learned address information associated with the destination address to determine how to forward the packet.

By using a common link, the number of links required to aggregate two or more ring networks can be reduced. For example, in FIG. 5, only one link is required to aggregate ring networks 10(1) and 10(2) (without using a common link, two links would be required to aggregate the ring networks). If 20 rings were aggregated without using a common link, it would be necessary to connect the redundant network nodes at the connection point by 20 links in order to complete the rings.

Figure 6:
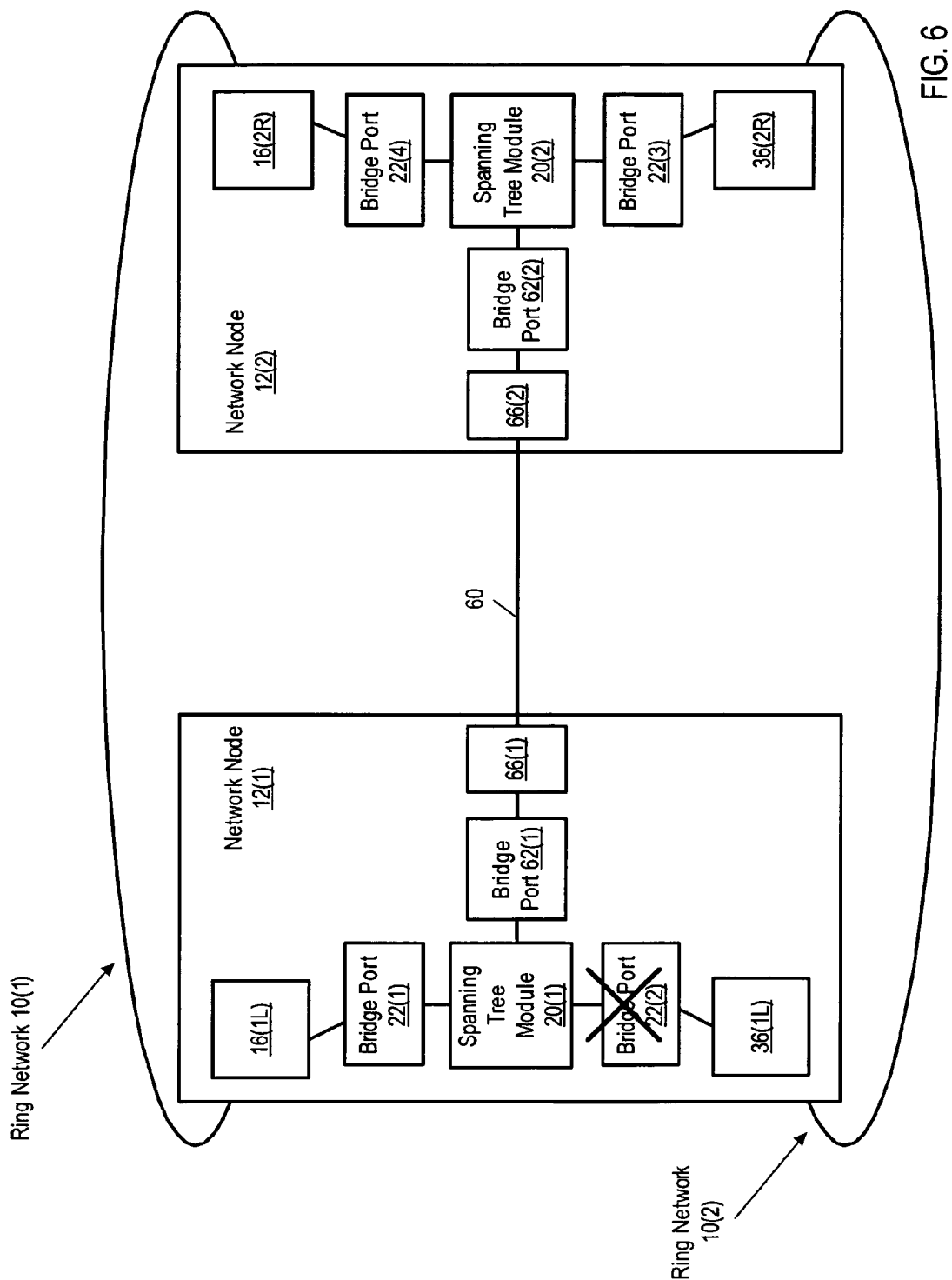
FIG. 6 is a block diagram of a pair of network nodes that provide a connection point for two ring networks, according to one embodiment of the present invention.

FIG. 6 is a block diagram of a pair of network nodes that provide a connection point for two ring networks. This figure shows a situation similar to that illustrated in FIG. 3, and like components have been numbered similarly. In the example of FIG. 6, ring network 10(1) and ring network 10(2) have been implemented using a common link 60. Thus, common link 60 is part of both ring network 10(1) and ring network 10(2). Traffic being conveyed in either ring network can be conveyed via common link 60.

As shown, ring ports 66(1) and 66(2) (included in network nodes 12(1) and 12(2) respectively) are coupled to each end of common link 60. Since each of ring ports 66(1) and 66(2) belong to multiple rings, ring ports 66(1) and 66(2) are each assigned to a single bridge port, which only represents a single ring port. As shown, bridge port 62(1) represents ring port 66(1) and bridge port 62(2) represents ring port 66(2). Bridge ports 62(1) and 66(2) can be controlled by spanning tree modules 20(1) and 20(2), and ring events detected by ring ports 66(1) and 66(2) can be conveyed to the spanning tree modules by changing the state of bridge ports 62(1) and 62(2), as described above.

Since the ring ports coupled to the common link have been assigned individual bridge ports, the ring ports that would otherwise be paired with those common link ring ports are also assigned individual bridge ports. Thus, ring port 16(1L) is assigned bridge port 22(1), ring port 36(1L) is assigned bridge port 22(2), ring port 16(2R) is assigned bridge port 22(4), and ring port 36(2R) is assigned bridge port 22(3).

Since common link 60 is shared among multiple rings, it is undesirable to block common link 60. Thus, the ring protocol implemented within each ring (e.g., RRR) is configured to not block the ring ports at each end of the common link. For example, in RRR, the ring protocol can be configured so that ports coupled to a common link cannot be elected as designated ports. Alternatively, the ring protocol can be configured so that a ring port coupled to a common link can only be elected as designated port if there are no other acceptable alternatives. Additionally, each spanning tree instance (e.g., as implemented by spanning tree modules 20(1) and 20(4)) is configured to not block the bridge ports that represent these ring ports. An administrator can configure spanning tree to behave in this way by assigning metrics to each bridge port 62(1) and 62(2). The assigned metrics are used by spanning tree to prioritize selection of ports to block. The assigned metrics are selected so that spanning tree will be unlikely to block the common link (e.g., the bridge ports that represent ring ports coupled to the common link can be assigned metrics that indicate that those bridge ports have high priorities).

If the spanning tree protocol is allowed to block the common link, the ability of the ring protocol to restore connectivity in response to failures within the rings that share the common link may be reduced (e.g., the ring protocol may no longer be able to recover from failures within a desired amount of time). In one embodiment, network nodes that include ports coupled to a common link are configured to generate error messages (e.g., log messages, email alerts, and the like) alerting administrators to this situation, if spanning tree blocks a bridge port that represents a ring port coupled to a common link.

As in the example of FIG. 2A, address learning can be performed based on bridge ports, not individual ring ports. If a ring protocol control packet identifying a ring network failure is received on a bridge port coupled to a common link, all addresses that are currently associated with that bridge port are deleted or invalidated. If a ring port, which is not coupled to the common link and is represented by an individual bridge port, fails, the learned address information for the individual bridge port allocated to the failed ring port is transferred to the bridge port coupled to the common link. For example, if ring port 36(1L) fails, any addresses that have been learned for bridge port 22(2) are transferred to bridge port 62(1). Thus, if network node 12(1) had previously identified address A as being reachable via bridge port 22(2), network node 12(1) will update its forwarding information to identify address A as now being reachable via bridge port 62(1).

All ring traffic (including ring protocol control packets) that is being conveyed via the common link is conveyed via the logical bridge port representing the ring port coupled to the common link. Thus, packets cannot be conveyed from one ring port (e.g., ring port 36(1L)) to a ring port coupled to the common link (e.g., ring port 66(1)) without being conveyed through the logical bridge port (e.g., bridge port 62(1)) representing the ring port coupled to the common link. This ensures that the topology that is discovered by the spanning tree protocol corresponds to the actual data path being used to convey packets.

As noted above, in some embodiments, the ring protocol is Rapid Ring Recovery (RRR), available from Cisco Systems, Inc. of San Jose, Calif. In RRR, there are several types of ring protocol control packets, including fail packets, heal packets, loop complete packets, and loop broken packets.

Fail packets are generated when a ring port detects that a link has gone down. The ring port that detects the failure generates a fail packet and sends the fail packet to a paired port. The paired port is either within the same network node as or directly coupled to the ring port that detects the failed link. When a network node receives a fail packet, that node floods the fail packet to the paired ring port in the same ring as the receiving ring port. Use of fail packets allows ring ports to detect topology changes within the ring and react appropriately. Fail packets are passed through bridge ports when being conveyed between paired ring ports that are allocated to different bridge ports (e.g., when conveyed between ring port 36(1L) and ring port 66(1)). In one embodiment, common link ring ports do not send fail packets when there is a breakage on the common link.

Heal packets are generated as a pair of ring protocol control packets, such that each heal packet is sent in opposite directions on the ring network. When a network node receives a heal packet, that node floods the heal packet from all ring ports in the same ring as the receiving ring port.

When a ring port transitions from a failed state to a non-failed state and consequently generates a heal packet, a new data path may be created. This may create a temporary loop. In order to cause spanning tree protocol to detect any possible loops that have been created, each ring port that generates or receives a heal packet causes the bridge port allocated to that ring port to change state (e.g., from failed to non-failed or vice versa). This causes a spanning tree instance instantiated within that node to begin sending BPDUs in order to discover the new topology. The receiving node will not propagate the heal packet to another node until after the bridge port state has been changed.

Loop complete packets are originated by the designated port and sent to both the paired port and the link coupled to the designated port. These packets are used to detect whether there is a loop in the ring network. These packets are also used to elect a designated port and to identify whether the elected designated port is currently blocking.

Loop broken packets are originated by the designated port and sent to both the paired port and the link. These packets are used to detect whether a loop has been restored, to elect a designated port, and to acknowledge receipt of a fail packet.

Figure 7:
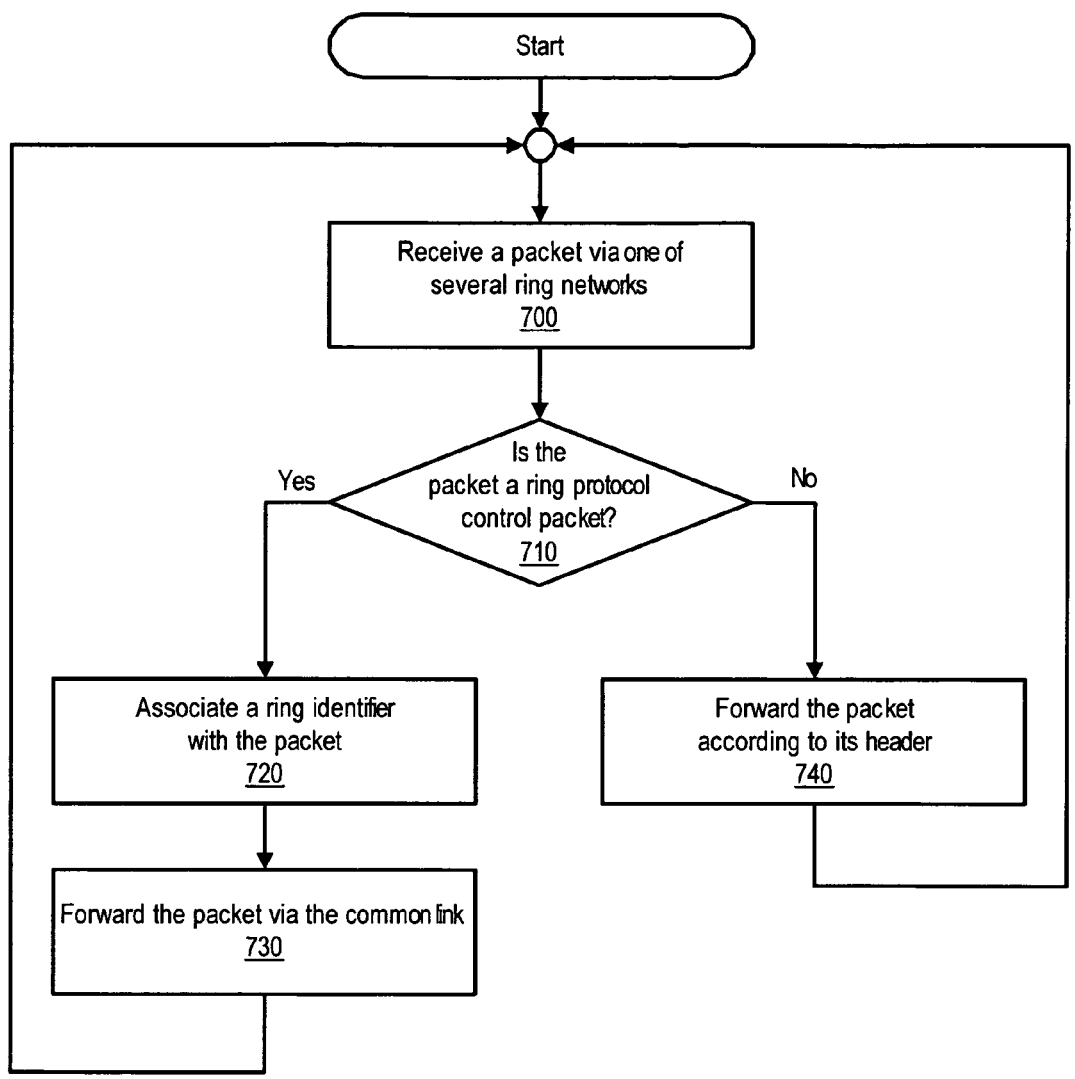
FIG. 7 is a flowchart of a method of sending packets received via any of several ring networks via a common link, according to one embodiment of the present invention.

FIG. 7 is a flowchart of a method of sending packets received via any of several ring networks via a common link. This method can be performed by a ring port that is coupled to output packets on a common link that is shared by multiple ring networks.

The method begins at 700, when the ring port receives a packet via one of several ring networks to output on the common link. If the packet is a ring protocol control packet, as determined at 710 (e.g., by examining the packet's header), the packet is associated with the ring identifier of the incoming ring (the ring in which the packet is being conveyed), as shown at 720, before being conveyed via the common link at 730. The packet can be associated with a ring identifier by appending the ring identifier to the packet. It is noted that the packet may already be associated with the ring identifier (e.g., if the ring identifier is included in the packet's header), and thus operation 720 is optional in some embodiments.

If the packet is not a ring protocol control packet, the packet is forwarded according to its header information, as shown at 740. If, based on the packet's header, a determination is made that the packet should be forwarded via the common link, the packet is forwarded, without regard to whether the packet is associated with a ring identifier, across the common link.

Figure 8:
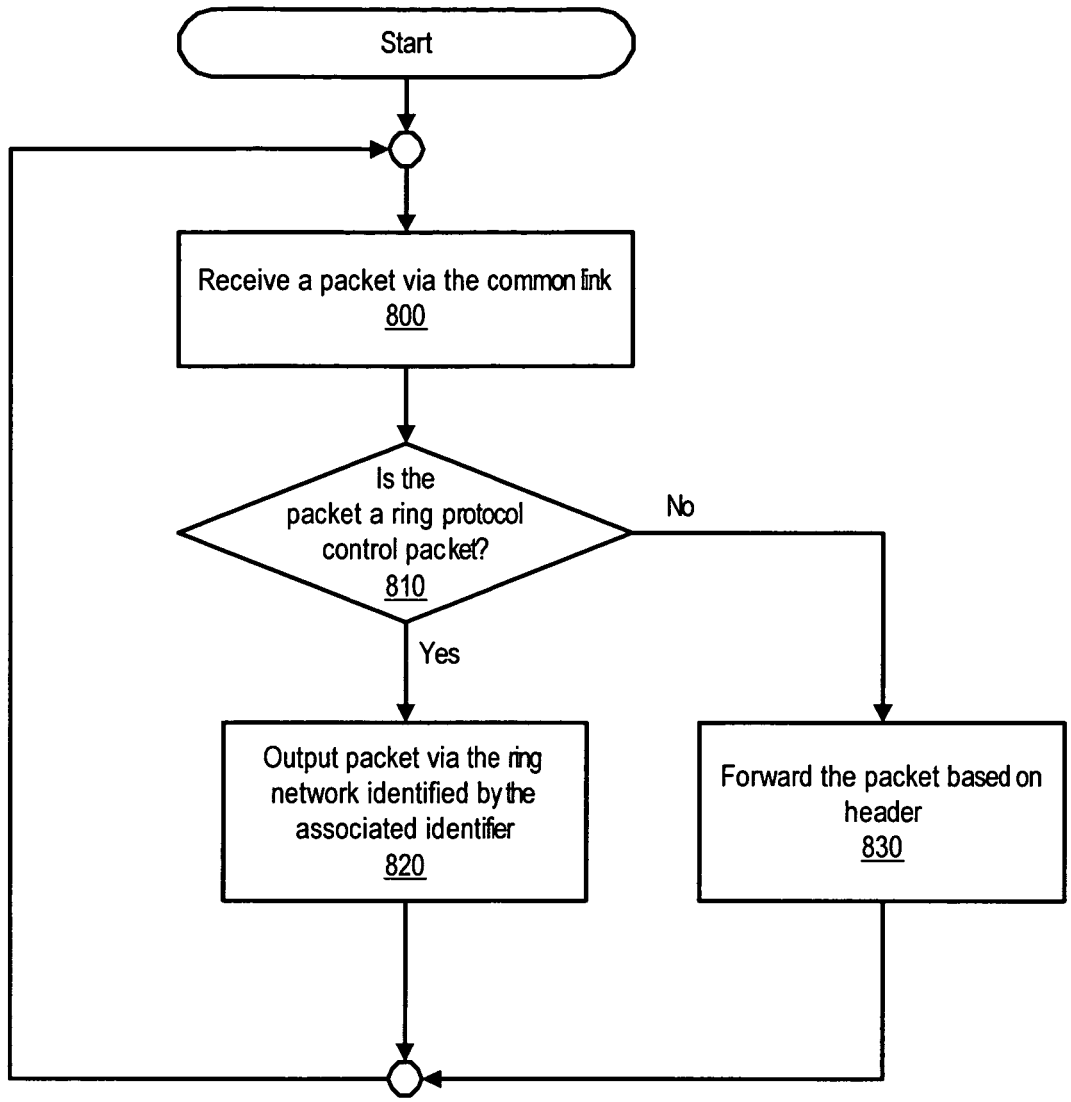
FIG. 8 is a flowchart of a method of handling packets received via a common link, according to one embodiment of the present invention.

FIG. 8 is a flowchart of a method of handling packets received via a common link. This method can be performed by a ring port that is coupled to receive packets via a common link that is shared among multiple ring networks.

The method begins at 800, when a packet is received via the common link. If the packet is a ring protocol control packet, as determined at 810 (e.g., by examining the packet's header), the packet is output via the ring network that is identified by the ring identifier associated with the packet, as shown at 820. For example, if the packet includes a ring identifier or if a ring identifier has been appended to the packet, the packet is output from the ring identified by that identifier.

If the packet is not a ring protocol control packet, the packet is forwarded based on its header information, as shown at 830. For example, if the header indicates that the packet is being broadcast, the packet will be output from all packets in the incoming VLAN. Thus, the packet is forwarded without regard to the ring in which the packet was being conveyed. The packet can be forwarded using learned address information (e.g., if the header indicates that the packet is being conveyed to address D, and if learned address information identifies address D as being reachable via port 2, the packet will be output from port 2).

Figure 9:
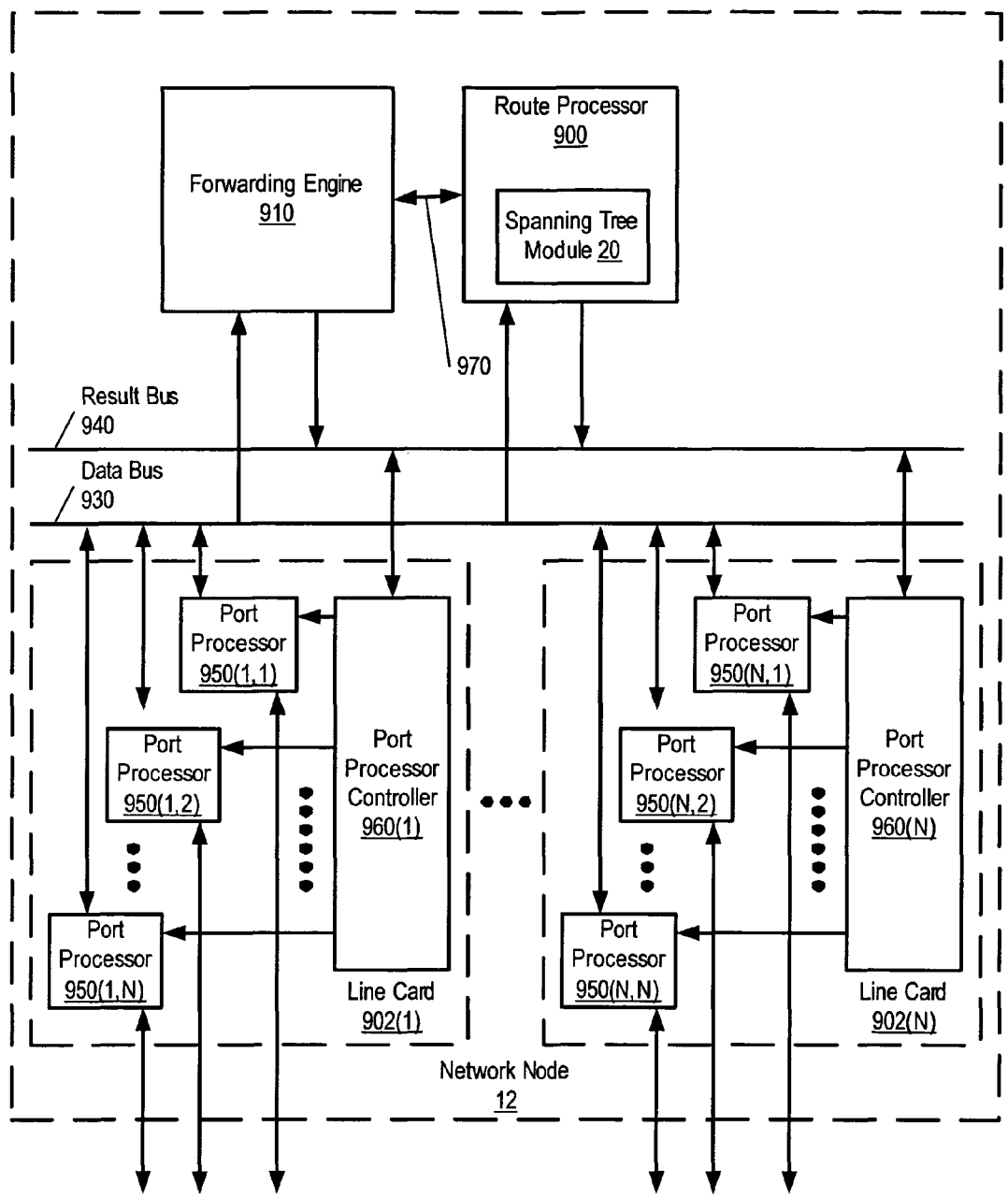
FIG. 9 shows a block diagram of a network node that can implement a virtual port and/or handle packets conveyed via a common link, according to one embodiment of the present invention.

FIG. 9 shows a block diagram of a network node 12 (e.g., one of network nodes 12(1)-12(4) of FIGS. 1, 2, 3, 5, and 6). In this depiction, network node 12 includes a number of line cards (line cards 902(1)-902(N)) that are communicatively coupled to a forwarding engine 910 and a route processor 900 via a data bus 930 and a result bus 940. Line cards 902(1)-902(N) include a number of port processors 950(1,1)-950(N,N) which are controlled by port processor controllers 960(1)-960(N). One or more port processors 950(1,1)-950(N,N) can be configured as ring ports by assigning ring identifiers to those port processors. It will also be noted that forwarding engine 910 and route processor 900 are not only coupled to one another via data bus 930 and result bus 940, but are also communicatively coupled to one another by a communications link 970. It is noted that in alternative embodiments, each line card can include a forwarding engine. It is noted that route processor 900 and forwarding engine 910 implement the functionality of the control module 18 shown in FIG. 2A. The functionality of spanning tree module 20 can be implemented in route processor 900.

When a packet is received, the packet is identified and analyzed by a network device such as network node 12 in the following manner, according to embodiments of the present invention. Upon receipt, a packet (or some or all of its control information) is sent from the one of port processors 950(1,1)-950(N,N) at which the packet was received to one or more of those devices coupled to data bus 930 (e.g., others of port processors 950(1,1)-950(N,N), forwarding engine 910 and/or route processor 900). Handling of the packet can be determined, for example, by forwarding engine 910. For example, forwarding engine 910 may determine that the packet should be forwarded to one or more of port processors 950(1,1)-950(N,N). This can be accomplished by indicating to corresponding one(s) of port processor controllers 960(1)-960(N) that the copy of the packet held in the given one(s) of port processors 950(1,1)-950(N,N) should be forwarded to the appropriate one of port processors 950(1,1)-950(N,N).

In the example of FIG. 9, one or more (e.g., a pair) of port processors 950(1,1)-950(N,N) can be configured as ring ports for the same ring network. If one of these ring ports is configured as a port that is coupled to the common link, that port processor and its associated port processor controller can operate as described above with respect to FIGS. 5-8. Additionally, one or more port processors that are configured as ring ports can be represented by a logical bridge port, as described above with respect to FIGS. 1-4.

Figure 10:
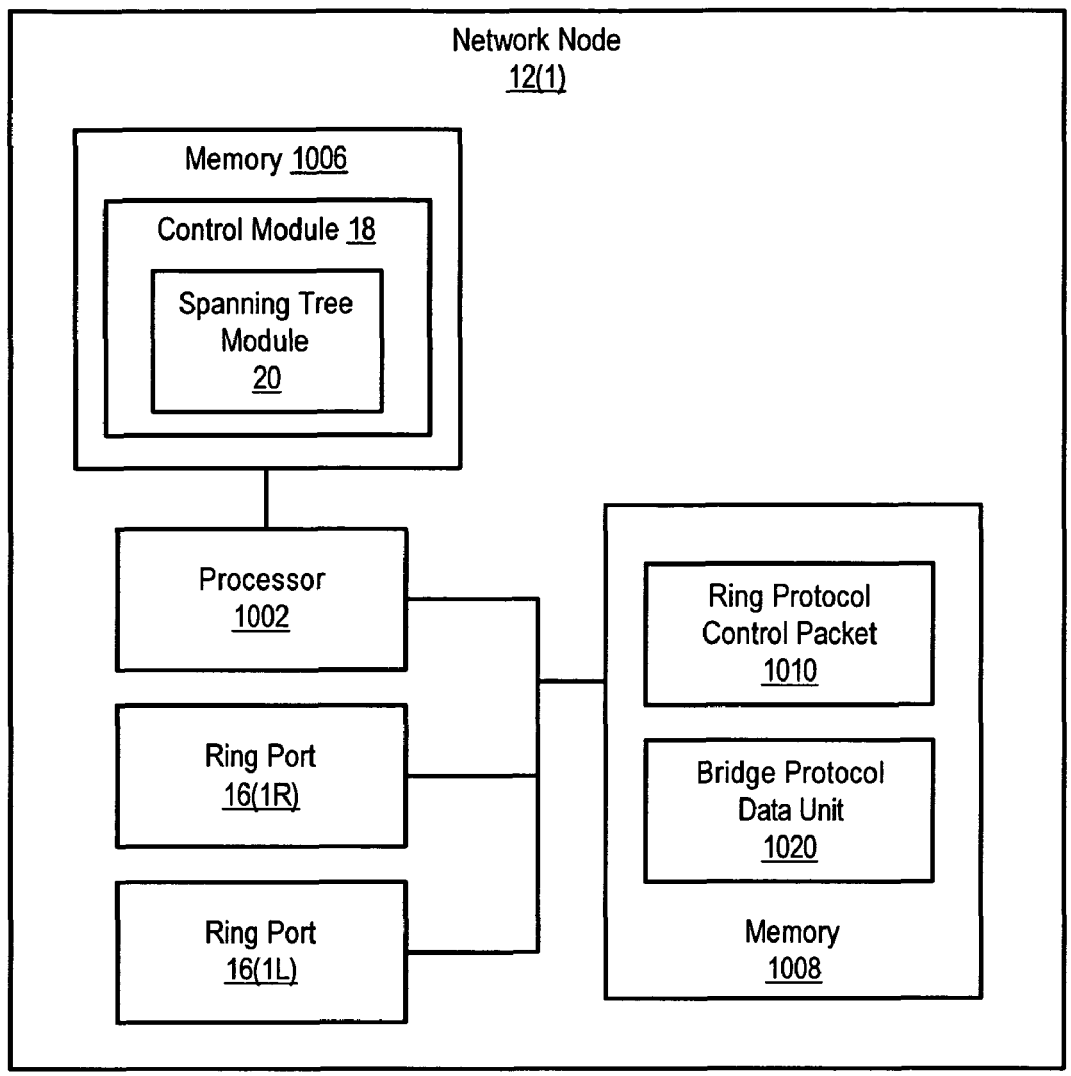
FIG. 10 is a block diagram of a network node that can use software to implement a virtual port and/or to handle packets conveyed via a common link, according to one embodiment of the present invention.

FIG. 10 is another block diagram of network node 12(1). (e.g., network node 12(1) of FIGS. 1, 2, 3, 5, 6, and 9), which illustrates how spanning tree module 20 can be implemented in software. As illustrated, network node 12(1) includes one or more processors 1002 (e.g., microprocessors, PLDs (Programmable Logic Devices), or ASICs (Application Specific Integrated Circuits)) configured to execute program instructions stored in memory 1006. Memory 1006 can include various types of RAM (Random Access Memory), ROM (Read Only Memory), Flash memory, MEMS (Micro Electro-Mechanical Systems) memory, and the like. Processor 1002 and memory 1006 can be included in a port processor (e.g., port processors 950(1,1)-950(N,N) of FIG. 9), a port processor controller (e.g., port processor controllers 960(1)-960(N)), a forwarding engine (e.g., forwarding engine 910 of FIG. 9), or a route processor (e.g., route processor 900 of FIG. 9). Processor 1002 and memory 1006 are coupled to send and receive data and control signals by a bus or other interconnect.

Network node 12(1) also includes a ring ports 16(1L) and 16(1R). These ring ports can be assigned a logical bridge port (e.g., representing one or both of the ring ports) and/or coupled to a common link. In response to receiving a packet (e.g., such as ring protocol control packet 1010 and BPDU 1020), ring ports 16(1L) and 16(1R) can store copies of the received packets in memory 1008. Processor 1002, ring ports 16(1L) and 16(1R), and memory 1008 are coupled to send and receive data and control signals by a bus or other interconnect.

In this example, program instructions executable to implement control module 18, which includes spanning tree module 20, are stored in memory 1006. The program instructions and data implementing control module 18 can be stored on various computer readable media such as memory 1006. In some embodiments, such software is stored on a computer readable medium such as a CD (Compact Disc), DVD (Digital Versatile Disc), hard disk, optical disk, tape device, floppy disk, and the like). In order to be executed by processor 1002, the instructions and data implementing control module 18 are loaded into memory 1006 from the other computer readable medium. The instructions and/or data implementing control module 18 can also be transferred to network node 12(1) for storage in memory 1006 via a network such as the Internet or upon a carrier medium. In some embodiments, a computer readable medium is a carrier medium such as a network and/or a wireless link upon which signals such as electrical, electromagnetic, or digital signals, on which the data and instructions implementing control module 18 are encoded, are conveyed.

Although the present invention has been described in connection with several embodiments, the invention is not intended to be limited to the specific forms set forth herein. On the contrary, it is intended to cover such alternatives, modifications, and equivalents as can be reasonably included within the scope of the invention as defined by the appended claims.

What is claimed is:

1. A method comprising:
receiving a first ring protocol control packet from a first ring network via a first ring port, wherein
the first ring port is coupled to the first ring network;
appending a first ring identifier identifying the first ring network to the first ring protocol control packet, in response to receiving the first ring protocol control packet via the first ring port;
determining that a common ring port is associated with the first ring identifier, wherein the common ring port is coupled to a common link;
sending the first ring protocol control packet and the appended first ring identifier on the common link via the common ring port;
receiving a second ring protocol control packet from a second ring network via a second ring port, wherein
the second ring port is coupled to the second ring network;
appending a second ring identifier identifying the second ring network to the second ring protocol control packet, in response to receiving the second ring protocol control packet via the second ring port;
determining that the common ring port is associated with the second ring identifier;
sending the second ring protocol control packet and the appended second ring identifier on the common link via the common ring port, wherein
the common link is part of the first ring network and the second ring network;
receiving a first data packet via the first ring port; and
forwarding the first data packet on the common link via the common ring port, wherein
the first data packet is forwarded according to information in a header of the first data packet.

2. The method of claim 1, further comprising:
receiving a third ring protocol control packet from a third ring network via a third ring port, wherein the third ring port is coupled to the third ring network;
determining that the common ring port is associated with the third ring identifier; and
sending the third ring protocol control packet on the common link via the common ring port, wherein
the third ring identifier is appended to the third ring protocol control packet, the third ring identifier identifies the third ring network, and the common link is part of the third ring network.

3. The method of claim 1, further comprising:

receiving a third ring protocol control packet from the common link via the common ring port;

detecting that the first ring identifier is appended to the third ring protocol control packet;

removing the first ring identifier from the third ring protocol control packet;

forwarding the third ring protocol control packet to the first ring network via the first ring port;

receiving a fourth ring protocol control packet from the common link via the common ring port;

detecting that the second ring identifier is appended to the fourth ring protocol control packet;

removing the second ring identifier from the fourth ring protocol packet; and forwarding the fourth ring protocol control packet to the second ring network via the second ring port.

4. The method of claim 3, wherein the detecting that the third ring protocol control packet is associated with the first ring identifier comprises:

parsing a ring identifier field included in the third ring protocol control packet.

5. The method of claim 1, further comprising:

assigning a spanning tree metric to the common ring port coupled to the common link, wherein the spanning tree metric indicates that spanning tree should not block the common ring port.

6. A network node, comprising:

a first ring port configured to receive a first ring protocol control packet conveyed in a first ring network, and receive a first data packet;

a second ring port configured to receive a second ring protocol control packet conveyed in a second ring network;

a third ring port configured to be coupled to a common link, wherein the common link is part of the first ring network and the second ring network; and a control module coupled to the first ring port, the second ring port, and the third ring port, wherein the control module is configured to determine that the third ring port is associated with a first ring identifier identifying the first ring network, the control module is configured to determine that the third ring port is associated with a second ring identifier identifying the second ring network, the control module is configured to forward the first ring protocol control packet and the second ring protocol control packet on the common link via the third ring port, the control module is configured to append the first ring identifier identifying the first ring network to the first ring protocol packet prior to forwarding the first ring protocol control packet, the control module is configured to append the second ring identifier identifying the second ring network to the second ring protocol packet prior to forwarding the second ring protocol packet, and the control module is configured to forward the first data packet on the common link via the common ring port, wherein the first data packet is forwarded according to information in a header of the first data packet.

7. The network node of claim 6, further comprising:

a fourth ring port configured to receive a third ring protocol control packet conveyed in a third ring network, wherein the control module is configured to determine the third ring port is associated with a third ring identifier identifying the third ring network, the control module is configured to forward the third ring protocol control packet on the common link via the third ring port, the control module is configured to append the third ring identifier to the third ring protocol control packet prior to forwarding the third ring protocol packet, and the common link is part of the third ring network.

8. The network node of claim 6, wherein the third ring port is configured to receive a third ring protocol control packet from the common link via the common ring port, the control module is configured to detect that the first ring identifier is appended to the third ring protocol control packet, the control module is configured to remove the first ring identifier from the third ring protocol control packet, the control module is configured to forward the third ring protocol control packet to the first ring network via the first ring port, the third ring port is configured to receive a fourth ring protocol control packet from the common link via the common ring port, the control module is configured to detect that the second ring identifier is appended to the fourth ring protocol control packet, the control module is configured to remove the second ring identifier from the fourth ring protocol packet, and the control module is configured to forward the fourth ring protocol control packet to the second ring network via the second ring port.

9. The network node of claim 8, wherein the control module is configured to detect that the third ring protocol control packet is associated with the first ring identifier in response to parsing a ring identifier field included in the third ring protocol control packet.

10. The network node of claim 8, wherein the control module is configured to receive input assigning a spanning tree metric to a port coupled to the common link, and the spanning tree metric indicates that spanning tree should not block the port.

11. A system comprising:

a first network node;

a second network node; and a common link coupling the first network node and the second network node;

wherein the common link is part of a first ring network and a second ring network, the first network node is configured to receive a first ring protocol control packet via the first ring network and a second ring protocol control packet via the second ring network, the first network node is configured to append a first ring identifier identifying the first ring network to the first ring protocol control packet and to append a second ring identifier identifying the second ring network to the second ring protocol control packet, the first network node is configured to determine that a common ring port on the first network node is associated with the first ring identifier and the second ring identifier, the first network node is configured to forward the first ring protocol control packet and the appended first ring identifier and the second ring protocol control packet and the appended second ring identifier on the common link via the common ring port, the first network node is configured to receive a first data packet, and the first network node is configured to forward the first data packet on the common link via the common ring port, wherein the first data packet is forwarded according to information in a header of the first data packet.

12. The system of claim 11, wherein
the first network node is configured to receive a third ring protocol control packet conveyed in a third ring network,
the first network node is configured to determine that the common ring port is associated with a third ring identifier identifying the third ring network,
the first network node is configured to forward the third ring protocol control packet on the common link via the common ring port,
the first network node is configured to append the third ring identifier to the third ring protocol control packet prior to forwarding the third ring protocol packet, and
the common link is part of the third ring network.

13. The system of claim 11, wherein
the first network node is configured to receive a third ring protocol control packet via the common link,
the first network node is configured to detect that the first ring identifier is appended to the third ring protocol control packet,
the first network node is configured to remove the first ring identifier from the third ring protocol control packet,
the first network node is configured to forward the third ring protocol control packet via the first ring network,
the first network node is configured to receive a fourth ring protocol control packet via the common link,
the first network node is configured to detect that the second ring identifier is appended to the fourth ring protocol control packet,
the first network node is configured to remove the second ring identifier from the fourth ring protocol packet, and
the first network node is configured to forward the fourth ring protocol control packet via the second ring network.

14. The system of claim 13, wherein
the first network node is configured to detect that the third ring protocol control packet is associated with the first ring identifier in response to parsing a ring identifier field included in the third ring protocol control packet.

15. The system of claim 13, wherein
the first network node is configured to receive input assigning a spanning tree metric to a port coupled to the common link, and
the spanning tree metric indicates that spanning tree should not block the port.

16. A system comprising:
means for receiving a first ring protocol control packet from a first ring network via a first ring port, wherein the first ring port is coupled to the first ring network;
means for determining a common ring port is associated with a first ring identifier identifying the first ring network;
means for appending the first ring identifier identifying the first ring network to the first ring protocol control packet, in response to the means for receiving the first ring protocol control packet via the first ring port;
means for sending the first ring protocol control packet and the appended first ring identifier on a common link via the common ring port;
means for receiving a second ring protocol control packet from a second ring network via a second ring port, wherein
the second ring port is coupled to the second ring network;
means for determining the common ring port is associated with a second ring identifier identifying the second ring network;
means for appending the second ring identifier identifying the second ring network to the second ring protocol control packet, in response to the means for receiving the second ring protocol control packet via the second ring port;
means for sending the second ring protocol control packet and the appended second ring identifier via the common link, wherein
the common link is part of the first ring network and the second ring network;
means for receiving a first data packet via the first ring port; and
means for forwarding the first data packet on the common link via the common ring port, wherein the first data packet is forwarded according to information in a header of the first data packet.

17. The method of claim 1, further comprising
receiving a third ring protocol control packet from a third ring network via the
first ring port, wherein
the first ring port is associated with the first ring identifier,
the first ring port is coupled to the third ring network, and
the first ring port is associated with a third ring identifier identifying the third ring network;
determining that the common ring port is associated with the third ring identifier; and
sending the third ring protocol control packet on the common link via the common ring port, wherein
the third ring identifier is appended to the third ring protocol control packet, and
the common link is part of the third ring network.

18. The method of claim 1, further comprising:
detecting that the first ring port is in a blocked state; and
in response to the detecting, blocking data packets received at the first ring port,
wherein
ring protocol control packets received by the first ring port are not blocked,
a ring protocol blocks the first ring port, and
the ring protocol is configured to not block the common ring port.

19. The method of claim 1, further comprising:
receiving a second data packet from the common link via the common ring port; and
forwarding the second data packet according to information in a header of the second data packet.

20. A method comprising:
receiving a first packet from a first ring network of a plurality of ring networks;
determining whether the first packet is a ring protocol control packet;

in response to a first determination that the first packet is the ring protocol control packet,
  appending a first ring identifier to the ring protocol control packet, wherein
    the first ring identifier identifies the first ring network from which the ring protocol control packet was received, and
  sending the ring protocol control packet and the first ring identifier on a common link shared by the plurality of ring networks; and
in response to a second determination that the first packet is not the ring protocol control packet,
  forwarding the first packet on the common link, wherein the first packet is forwarded according to information in a header of the first packet.

21. The method of claim 20, further comprising:
receiving a second packet from the common link;
determining whether the second packet is a second ring protocol control packet;

in response to a third determination that the second packet is the second ring protocol control packet,
  detecting that a second ring identifier is appended to the second ring protocol control packet, wherein
    the second ring identifier identifies a second ring network to which the second ring protocol control packet should be forwarded, and
  sending the second ring protocol control packet to the second ring network identified by the second ring identifier; and
in response to a fourth determination that the second packet is not the second ring protocol control packet,
  forwarding the second packet, wherein
    the second packet is forwarded according to information in a header of the second packet.

\* \* \* \* \*